United States Patent
Hodes et al.

(10) Patent No.: US 10,528,506 B2
(45) Date of Patent: Jan. 7, 2020

(54) UNIFORM PERFORMANCE MONITOR FOR A DATA STORAGE DEVICE AND METHOD OF OPERATION

(71) Applicant: WESTERN DIGITAL TECHNOLOGIES, INC., San Jose, CA (US)

(72) Inventors: Avichay Haim Hodes, Kfar Ben Nun (IL); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/786,763

(22) Filed: Oct. 18, 2017

(65) Prior Publication Data

US 2019/0114276 A1    Apr. 18, 2019

(51) Int. Cl.
*G06F 13/38* (2006.01)
*G06F 13/40* (2006.01)
*G06F 13/16* (2006.01)
*G06F 3/06* (2006.01)

(52) U.S. Cl.
CPC .......... *G06F 13/385* (2013.01); *G06F 3/0653* (2013.01); *G06F 3/0656* (2013.01); *G06F 3/0659* (2013.01); *G06F 13/1673* (2013.01); *G06F 13/4027* (2013.01); *G06F 3/0689* (2013.01)

(58) Field of Classification Search
CPC .... G06F 13/385; G06F 3/0653; G06F 3/0656; G06F 3/0659; G06F 13/1673; G06F 13/4027; G06F 3/0689
See application file for complete search history.

(56) References Cited

U.S. PATENT DOCUMENTS

| | | | |
|---|---|---|---|
| 5,522,050 A | 5/1996 | Amini et al. | |
| 5,623,700 A | 4/1997 | Parks et al. | |
| 5,870,567 A | 2/1999 | Hausauer et al. | |
| 6,247,086 B1 | 6/2001 | Allingham | |
| 7,162,565 B1 | 1/2007 | Kolokowsky et al. | |
| 7,519,725 B2 * | 4/2009 | Alvarez | H04L 29/06 370/229 |
| 7,668,177 B1 * | 2/2010 | Trapp | H04L 12/40032 370/395.42 |
| 8,271,692 B1 | 9/2012 | Dinh et al. | |
| 2004/0194095 A1 * | 9/2004 | Lumb | G06F 9/4887 718/100 |

(Continued)

*Primary Examiner* — Tim T Vo
*Assistant Examiner* — Harry Z Wang
(74) *Attorney, Agent, or Firm* — Vierra Magen Marcus LLP (57) ABSTRACT

An apparatus includes a first interface configured to receive a first message from a host device or from a data storage device. The apparatus further includes a buffer and a second interface. The buffer is coupled to the first interface and is configured to store the first message. The second interface is coupled to the buffer and is configured to provide the first message to the data storage device or to the host device, respectively. The second interface is further configured to provide, at a time based on a performance metric associated with the first message, a second message to the data storage device or to the host device, respectively. The apparatus further includes a circuit configured to determine the performance metric.

20 Claims, 5 Drawing Sheets

(56) References Cited

U.S. PATENT DOCUMENTS

| | | | |
|---|---|---|---|
| 2008/0089351 A1* | 4/2008 | Hu | H04L 47/10 |
| | | | 370/412 |
| 2009/0147796 A1* | 6/2009 | Chow | H04L 47/6215 |
| | | | 370/413 |
| 2013/0148504 A1* | 6/2013 | Ungureanu | H04L 47/17 |
| | | | 370/235 |
| 2015/0134857 A1* | 5/2015 | Hahn | G06F 3/061 |
| | | | 710/5 |
| 2016/0210074 A1 | 7/2016 | Gerhart | |
| 2016/0320971 A1 | 11/2016 | Postavilsky et al. | |
| 2017/0109096 A1 | 4/2017 | Jean et al. | |

* cited by examiner

UNIFORM PERFORMANCE MONITOR FOR A DATA STORAGE DEVICE AND METHOD OF OPERATION

FIELD OF THE DISCLOSURE

This disclosure is generally related to electronic devices and more particularly to monitoring performance of data storage devices used by electronic devices to store data.

BACKGROUND

Data storage devices enable users to store and retrieve data. Examples of data storage devices include volatile memory devices and non-volatile memory devices. A non-volatile memory may retain data after a power-down event.

Data storage devices may be designed based on one or more performance rates, such as a target throughput, a target latency, or a target power consumption. In some cases, data storage devices associated with a particular performance rate may perform differently, such as if one data storage device performs "better" or "worse" than the target performance rate. As an illustrative example, different instances of a particular product (e.g., different versions of a particular model of an electronic device, such as a notebook device, as an illustrative example) may each include data storage devices from multiple sources (e.g., vendors). For example, a first instance of the particular product may include a first data storage device from a first source, and a second instance of the particular product may include a second data storage device from a second source. In some cases, the data storage devices may have a similar design but may perform differently. In this case, a particular instance of an electronic device may have different performance characteristics than another instance of the electronic device.

Performance differences in data storage devices may be problematic in some cases. For example, end users may conclude that certain products are slower or less power-efficient than others, which may reduce product sales, increase product returns, or both.

DETAILED DESCRIPTION

In a particular example, a system includes a bridge device, an access device (e.g., a host device), and a data storage device. The bridge device is configured to receive commands from the access device, to store the commands at one or more buffers of the bridge device, and to provide the commands to the data storage device for execution by the data storage device.

The bridge device is configured to determine a performance metric associated with one or more of the commands. For example, the bridge device may determine a throughput associated with execution of a first command by the data storage device, a latency associated with execution of the first command by the data storage device, or both.

In some circumstances, the bridge device may "throttle" performance of the system based on the performance metric. For example, the bridge device may use the performance metric to determine a time at which a second command is provided to the data storage device. As an example, if the performance metric indicates that throughput associated with execution of the first command satisfies a threshold, the bridge device may delay providing the second command to the data storage device, such as by inserting a no-operation (NOOP) command in the buffer. As another example, if the performance metric indicates that latency associated with execution of the first command is less than a threshold, the bridge device may delay providing the second command to the data storage device.

By selectively throttling performance of the system (e.g., by delaying providing one or more commands to the data storage device), the bridge device may "smooth" or "equalize" performance differences associated with data storage devices. For example, a group of data storage devices may each include a bridge device that "limits" performance of the data storage device from exceeding a threshold. As a result, performance of the data storage devices may appear more "uniform" to end users.

Particular aspects of the present disclosure are described below with reference to the drawings. In the description, common features are designated by common reference numbers. Further, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." Further, an operation performed "based on" a condition or event may also be performed based on one or more other conditions or events not explicitly recited. As used herein, "exemplary" may indicate an example, an implementation, and/or an aspect, and should not be construed as limiting or as indicating a preference or a preferred example, implementation, and/or aspect.

Figure 1A:
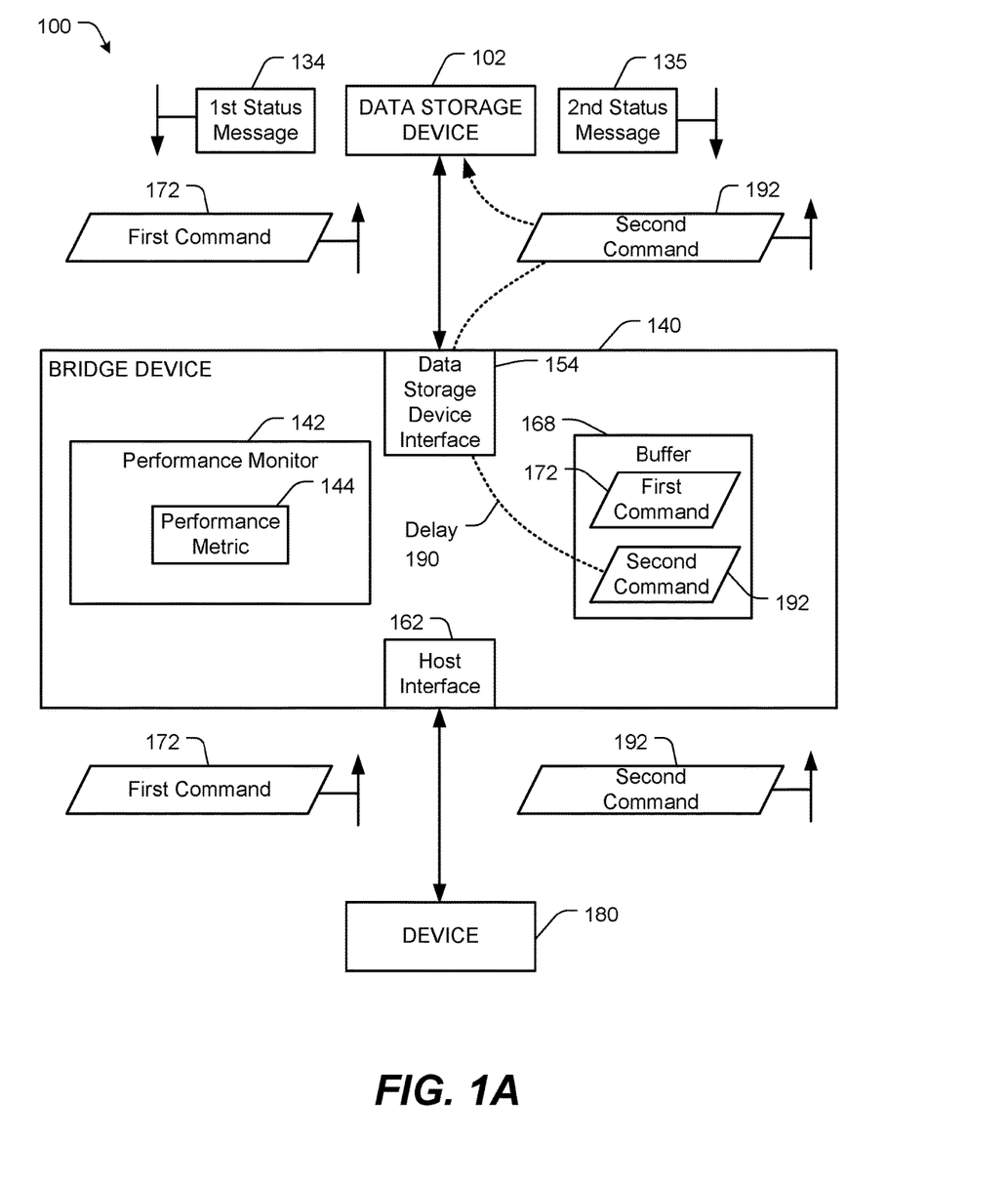
FIG. 1A is a block diagram of a particular illustrative example of a system including a device, a data storage device, and a bridge device that includes a performance monitor.

Referring to FIG. 1A, an illustrative example of a system is depicted and generally designated 100. The system 100 includes a data storage device 102, a bridge device 140, and a device 180 (e.g., a host device of the data storage device 102 or an accessing device that accesses the data storage device 102). The device 180 may also be referred to as a "master" device of the system 100. The bridge device 140 is configured to selectively adjust (e.g., "throttle") performance of the system 100.

The bridge device 140 is coupled to the data storage device 102 and to the device 180. For example, the bridge device 140 may be coupled to a bus or a socket that connects the data storage device 102 to the device 180. In an illustrative implementation, the bridge device 140 is coupled to the data storage device 102 and to the device 180 via a peripheral component interconnect (PCI) connection, such as via a PCI Express (PCIe) bus or within a PCIe socket. In some implementations, the data storage device 102 and the bridge device 140 are integrated within the device 180 in connection with a solid state drive (SSD) implementation.

The bridge device 140 includes a host interface 162. The host interface 162 is configured to receive commands from the device 180 to access the data storage device 102. For example, the host interface 162 is configured to receive a first message, such as a first command 172 (e.g., a read command or a write command) from the device 180 to access the data storage device 102 (e.g., to initiate a read operation or a write operation at the data storage device 102). As another example, the host interface 162 is configured to receive a second message, such as a second command 192 (e.g., a read command or a write command) from the device 180 to access the data storage device 102 (e.g., to initiate a read operation or a write operation at the data storage device 102).

The bridge device 140 further includes a buffer 168. The buffer 168 is coupled to the host interface 162. The buffer 168 is configured to store one or more commands received from the device 180, such as the first command 172, the second command 192, one or more other commands, or a combination thereof.

The bridge device 140 further includes a circuit (e.g., a performance monitor 142) configured to determine a performance metric 144 associated with the first command 172. To illustrate, the performance metric 144 may correspond to (e.g., may be equal to) or may be based on a throughput associated with execution of the first command 172 by the data storage device 102. Alternatively or in addition, the performance metric 144 may correspond to (e.g., may be equal to) or may be based on one or more other criteria, such as based on a latency associated with execution of the first command 172 by the data storage device 102.

The bridge device 140 further includes a data storage device interface 154 coupled to the buffer 168. The data storage device interface 154 is configured to provide commands from the buffer 168 to the data storage device 102 for execution by the data storage device 102, such as the first command 172, the second command 192, one or more other commands, or a combination thereof.

The data storage device interface 154 is configured to receive messages from the data storage device 102. For example, the data storage device interface 154 is configured to receive a first message, such as a first status message 134 (e.g., a command response) from the data storage device 102. The first status message 134 may be associated with execution of the first command 172 by the data storage device 102. For example, the first status message 134 may indicate a "pass" or "fail" status associated with execution of the first command 172 by the data storage device 102. As another example, the data storage device interface 154 is configured to receive a second message, such as a second status message 135 (e.g., a command response) from the data storage device 102. The second status message 135 may be associated with execution of the second command 192 by the data storage device 102. For example, the second status message 135 may indicate a "pass" or "fail" status associated with execution of the second command 192 by the data storage device 102. The host interface 162 is configured to provide the status messages 134, 135 to the device 180.

In some implementations, the bridge device 140 is configured to buffer messages received from the data storage device 102 using the buffer 168, one or more other buffers, or a combination thereof. For example, the buffer 168 may correspond to a "global" buffer that is configured to store messages received from both the data storage device 102 and the device 180. In another example, the buffer 168 is configured to store messages received from the device 180, and the bridge device 140 includes another buffer that is configured to store messages received from the data storage device 102.

In some implementations, the bridge device 140 may be "transparent" to one or more of the data storage device 102 and the device 180 (e.g., the device 180 may "see" a direct connection to the data storage device 102 instead of the bridge device 140). For example, a message format associated with messages (e.g., commands) received by the bridge device 140 from the device 180 may be used to provide the messages from the bridge device 140 to the data storage device 102. As another example, a message format associated with messages (e.g., command responses) received by the bridge device 140 from the data storage device 102 may be used to provide the messages from the bridge device 140 to the device 180. As a result, the bridge device 140 may be "transparent" to the data storage device 102 and the device 180.

The data storage device interface 154 is configured to provide a second message (e.g., the second command 192 or the second status message 135) to the data storage device 102 or to the device 180 at a time that is based on the performance metric 144. For example, in some circumstances, the performance monitor 142 may "throttle" performance of the system 100 based on the performance metric 144. As an illustrative example, the performance monitor 142 may be configured to create a delay 190 associated with providing the second command 192 to the data storage device 102, such as by inserting a no-operation (NOOP) command in the buffer 168, as described further with reference to FIG. 1B. Alternatively or in addition, the performance monitor 142 may be configured to apply the delay 190 in connection with providing the second status message 135 to the device 180.

In conjunction with FIG. 1A, an apparatus (e.g., the bridge device 140) includes a first interface configured to receive a first message from a host device or from a data storage device. For example, the first interface may correspond to the host interface 162, and the first message may correspond to the first command 172. As another example, the first interface may correspond to the data storage device interface 154, and the first message may correspond to the first status message 134. The apparatus further includes a buffer (e.g., the buffer 168) coupled to the first interface and configured to store the first message. The apparatus further includes a second interface coupled to the buffer and configured to provide the first message to the data storage device or to the host device, respectively. For example, the second interface may correspond to the data storage device interface 154. The data storage device interface 154 is configured to provide the first command 172 to the data storage device 102. As another example, the second interface may correspond to the host interface 162. The host interface 162 is configured to provide the first status message 134 to the device 180. The apparatus further includes a circuit (e.g., the performance monitor 142) configured to determine a performance metric (e.g., the performance metric 144) associated with the first message. The second interface is further configured to provide, at a time based on the performance metric, a second message to the data storage device or to the host device, respectively. For example, the data storage device interface 154 may be configured to provide the second command 192 to the data storage device 102 at a time based on the performance metric 144 (e.g., based on the delay 190). As another example, the host interface 162 may be configured to provide the second status message 135 to the device 180 at a time based on the performance metric 144 (e.g., based on the delay 190). In a particular example, the circuit is further configured to determine the time by delaying providing of the second message to the data storage device or to the host device, respectively, by the second interface in response to determining that the performance metric satisfies a threshold. For example, the circuit may be further configured to insert at least one NOOP command at the buffer to delay providing the second message to the data storage device or to the host device, respectively, as described further with reference to FIG. 1B.

Figure 1B:
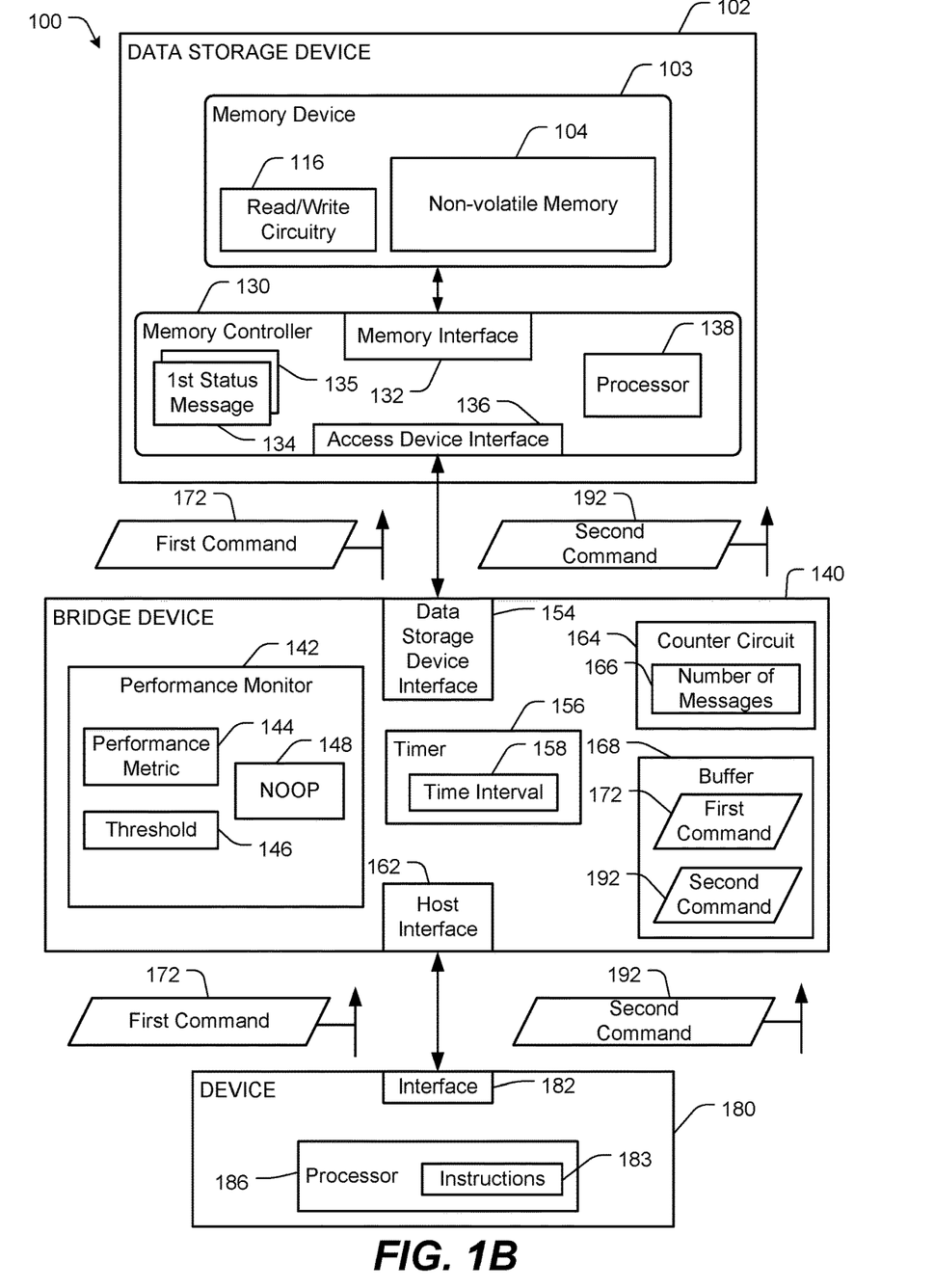
FIG. 1B is a block diagram that depicts additional illustrative aspects of a particular example of the system of FIG. 1A.

FIG. 1B depicts additional illustrative aspects of a particular example of the system 100 of FIG. 1A. FIG. 1B illustrates that the data storage device 102 includes a memory device 103 (e.g., one or more memory dies) and a controller, such as a memory controller 130. The memory controller 130 is coupled to the memory device 103.

The memory device 103 includes a non-volatile memory 104, such as a non-volatile array of storage elements included in one or more memory dies. The non-volatile memory 104 may include a flash memory (e.g., a NAND flash memory) or a resistive memory, such as a resistive random access memory (ReRAM), as illustrative examples. The non-volatile memory 104 may have a three-dimensional (3D) memory configuration. As used herein, a 3D memory device may include multiple physical levels of storage elements (instead of having a single physical level of storage elements, as in a planar memory device). As an example, the non-volatile memory 104 may have a 3D vertical bit line (VBL) configuration. In a particular implementation, the non-volatile memory 104 is a non-volatile memory having a 3D memory array configuration that is monolithically formed in one or more physical levels of arrays of memory cells having an active area disposed above a silicon substrate. Alternatively, the non-volatile memory 104 may have another configuration, such as a two-dimensional (2D) memory configuration or a non-monolithic 3D memory configuration (e.g., a stacked die 3D memory configuration).

The non-volatile memory 104 includes one or more regions of storage elements. An example of a storage region is a block, such as a NAND flash erase group of storage elements, or a group of resistance-based storage elements in a ReRAM implementation. Another example of a storage region is a word line of storage elements (e.g., a word line of NAND flash storage elements or a word line of resistance-based storage elements). A storage region may have a single-level-cell (SLC) configuration, a multi-level-cell (MLC) configuration, or a tri-level-cell (TLC) configuration, as illustrative examples. Each storage element of the non-volatile memory 104 may be programmable to a state (e.g., a threshold voltage in a flash configuration or a resistive state in a resistive memory configuration) that indicates one or more values. As an example, in an illustrative TLC scheme, a storage element is programmable to a state that indicates three values. As an additional example, in an illustrative MLC scheme, a storage element is programmable to a state that indicates two values.

The memory device 103 includes circuitry (e.g., read/write circuitry 116) to enable operation of the memory device 103, such as operation of one or more memory dies of the memory device 103. The read/write circuitry 116 may be a single component or may include separate components of the memory device 103, such as read circuitry and write circuitry.

The memory device 103 is coupled to the memory controller 130 via a communication path, such as a bus. For example, the communication path may include one or more channels to enable the memory controller 130 to communicate with a single memory die of the memory device 103. As another example, the communication path may include multiple distinct channels (e.g., multiple communication channels) to enable the memory controller 130 to communicate with each memory die of the memory device 103 in parallel with, and independently of, communication with other memory dies of the memory device 103.

The memory controller 130 includes a memory interface 132 configured to communicate with the memory device 103. The memory controller 130 further includes an access device interface 136 configured to communicate with the device 180 via the bridge device 140.

The memory controller 130 is configured to receive data from the device 180 via the bridge device 140 and via the access device interface 136, such as in connection with a request for write access to the non-volatile memory 104. The memory controller 130 may be configured to encode the data to generate one or more error correcting code (ECC) codewords using one or more ECC encoding techniques. For example, the memory controller 130 may include a Reed-Solomon (RS) encoder, a Bose-Chaudhuri-Hocquenghem (BCH) encoder, a low-density parity-check (LDPC) encoder, an encoder configured to encode data according to one or more other ECC techniques, or a combination thereof.

The memory controller 130 is configured to send data to the memory device 103 (e.g., via the memory interface 132). The memory device 103 is configured to store the data to the non-volatile memory 104.

The memory controller 130 is configured to access data from the non-volatile memory 104. As an illustrative example, the memory controller 130 may receive a request for read access to the data. The memory controller 130 may send a read command to the memory device 103 to initiate reading of the data. In response to the read command, the memory device 103 may sense the data using the read/write circuitry 116 to generate sensed data. Depending on the particular implementation, the sensed data may include a set of hard bits representing the data, a set of soft bits representing the data, or both. In some cases, the sensed data may differ from the data due to one or more bit errors.

The memory device 103 may provide sensed data to the memory controller 130. The memory controller 130 is configured to receive the sensed data from the memory device 103 (e.g., via the memory interface 132). The memory controller 130 may be configured to decode data read from the non-volatile memory 104 to detect and correct, up to an error correction capability of the ECC scheme, one or more bit errors that may be present in the data. The memory controller 130 may include an RS decoder, a BCH decoder, an LDPC decoder, a decoder configured to decode data according to one or more other ECC techniques, or a combination thereof. The memory controller 130 may be configured to provide decoded data to the device 180 via the bridge device 140.

The memory controller 130 further includes one or more processors, such as a processor 138. In an illustrative example, the processor 138 corresponds to a central processing unit (CPU) of the memory controller 130. The processor 138 is configured to control operations of the data storage device 102, such as by controlling read operations to the non-volatile memory 104, write operations to the non-volatile memory 104, other operations, or a combination thereof. The processor 138 is configured to execute instructions that may be received from the non-volatile memory 104 or from a memory included in the memory controller 130, such as a read-only memory (ROM), as illustrative examples.

In the example of FIG. 1B, the bridge device includes a timer 156 and a counter circuit 164. In a particular example, the counter circuit 164 is coupled to the buffer 168.

The device 180 includes an interface 182 configured to communicate with the data storage device 102 via the bridge device 140. The device 180 further includes one or more processors, such as a processor 186. The processor 186 is configured to execute instructions 183.

During operation, the bridge device 140 may receive commands from the device 180 to access the non-volatile memory 104. For example, the bridge device 140 may receive the first command 172 and the second command 192 from the device 180. The bridge device 140 may also receive messages from the data storage device 102, such as the status messages 134, 135. Although certain examples herein are described with reference to messages received from the device 180 (e.g., the commands 172, 192), it should be appreciated that such examples are also applicable to messages received from the data storage device 102 (e.g., the status messages 134, 135).

The buffer 168 is configured to store commands received from the device 180, from the data storage device 102, or both. In a particular example, the buffer 168 corresponds to a first-in, first-out (FIFO) queue. In some examples, the buffer 168 is output messages in response to a control signal asserted by the performance monitor 142. For example, the buffer 168 may provide the first command 172 to the data storage device interface 154 to be provided to the data storage device 102 in response to a control signal asserted by the performance monitor 142. As another example, the buffer 168 may provide the first status message 134 to the host interface 162 to be provided to the device 180 in response to a control signal asserted by the performance monitor 142.

The performance monitor 142 may determine the performance metric 144 based on one or more criteria associated with a first message, such as the first command 172 or the first status message 134. In an illustrative example, the timer 156 is configured to determine one or more time intervals associated with one or more messages. For example, the timer 156 may be configured to determine a time interval 158 between providing the first command 172 from the bridge device 140 to the data storage device 102 and receipt of the first status message 134. The performance metric 144 may correspond to or may be based on the time interval 158. Alternatively or in addition, the performance metric 144 may be based on one or more other criteria, such as latency associated with the first command 172 or the first status message 134, a throughput associated with the first command 172 or the first status message 134, one or more other criteria, or a combination thereof.

The performance monitor 142 may be configured to determine whether the performance metric 144 satisfies (e.g., exceeds) a threshold 146. To illustrate, depending on the particular implementation, the threshold 146 may correspond to a threshold time interval, a threshold latency, a threshold throughput, or another threshold. In a particular illustrative example, the performance monitor 142 includes a comparator circuit having a first input configured to receive the performance metric 144 and a second input configured to receive the threshold 146. The comparator circuit may be configured to generate an output indicating whether the performance metric 144 satisfies the threshold 146.

If the performance metric 144 satisfies the threshold 146, the performance monitor 142 may cause the buffer 168 to delay outputting a second message, such as by delaying outputting the second command 192 to the data storage device 102 via the data storage device interface 154 or by delaying outputting the second status message 135 to the device 180 via the host interface 162. The performance monitor 142 may be configured to determine (e.g., select) a time at which the second command 192 is provided to the data storage device 102, a time at which the second status message 135 is provided to the device 180, or both. For example, the performance monitor 142 may be configured to create the delay 190 of FIG. 1A, such as by inserting a no-operation (NOOP) command 148 in the buffer 168 to affect (e.g., determine) the time at which the second command 192 is provided to the data storage device 102 (e.g., to create the delay 190). In a particular example, the performance monitor 142 may insert the NOOP command 148 in a slot of the buffer that is "ahead" of a slot of the buffer 168 associated with the second command 192 (so that the NOOP command 148 is "ahead" of the second command 192 in the buffer 168).

The NOOP command 148 may be provided to the data storage device 102 via the data storage device interface 154. Execution of the NOOP command 148 may cause the data storage device 102 to "stall" for one or more execution cycles. After providing the NOOP command 148 to the data storage device 102, the bridge device 140 may provide the second command 192 to the data storage device 102 for execution by the data storage device 102.

In some implementations, the performance monitor 142 is configured to insert a particular number of NOOP commands 148 at the buffer 168 based on the performance metric 144. For example, if the performance metric 144 satisfies the threshold 146 by at least a first amount and by less than a second amount, the performance monitor 142 may insert a first number of NOOP commands 148 (e.g., one NOOP command 148) at the buffer 168. As another example, if the performance metric 144 satisfies the threshold 146 by at least the second amount and by less than a third amount, the performance monitor 142 may insert a second number of NOOP commands 148 (e.g., two NOOP commands 148) at the buffer 168.

In some implementations, the counter circuit 164 is configured to determine a number of messages 166 stored at the buffer 168. In this case, the performance monitor 142 may be configured to determine the performance metric 144 in response to determining that the number of messages 166 exceeds one.

If the performance metric 144 fails to satisfy the threshold 146, the performance monitor 142 may cause the buffer 168 to provide the second command 192 to the data storage device interface 154 without creating a delay associated with the second command 192. For example, if the performance metric 144 fails to satisfy the threshold 146, the performance monitor 142 may refrain from providing the NOOP command 148 to the buffer 168.

In some implementations, the threshold 146 may be provided to the bridge device 140 during a configuration process (e.g., "at the factory"). For example, the bridge device 140 may include a configuration register that is coupled to the performance monitor 142 and that is configured to store an indication of the threshold 146. An indication of the threshold 146 may be provided to the configuration register during the configuration process. The threshold 146 may be selected based on one or more criteria, such as based on a "worst case" performance of a particular platform (or product model) of data storage devices corresponding to the data storage device 102. Alternatively or in addition, the threshold 146 may be selected based on system conditions such as SSD driver characteristics, CPU power consumption (e.g., power consumption of the processor 186), system temperature, cooling impact, one or more other parameters, or a combination thereof.

Although the example of FIG. 1B illustrates a single performance metric 144 and a single threshold 146, in other implementations, multiple performance metrics and multiple thresholds may be used. For example, as described further with reference to FIG. 2, multiple performance metrics may include throughput and latency. The multiple performance metrics may be compared to respective thresholds, and the bridge device 140 may initiate performance "throttling" in response to one or more of the multiple performance metrics satisfying a respective threshold.

Further, it is noted that in some implementations, the system 100 may include multiple data storage devices 102 coupled to the device 180. In this case, a respective bridge device 140 may be coupled to each of the multiple data storage devices 102. Alternatively, in other implementations, a common bridge device 140 may be coupled to each of the multiple data storage devices 102.

In addition, although FIGS. 1A and 1B illustrate the bridge device 140 as being external to the device 180 and to the data storage device 102, in other examples, the bridge device 140 may be integrated within a component of the system 100. For example, one or more operations of the bridge device 140 may be performed using instructions executed by the processor 138.

By selectively throttling performance of the system 100 of FIGS. 1A and 1B (e.g., by delaying providing one or more commands to the data storage device 102), the bridge device 140 may reduce (e.g., "smooth" or "equalize") performance differences associated with a group of data storage devices that includes the data storage device 102. As a result, performance of the data storage devices may appear more "uniform" to end users.

Figure 2:
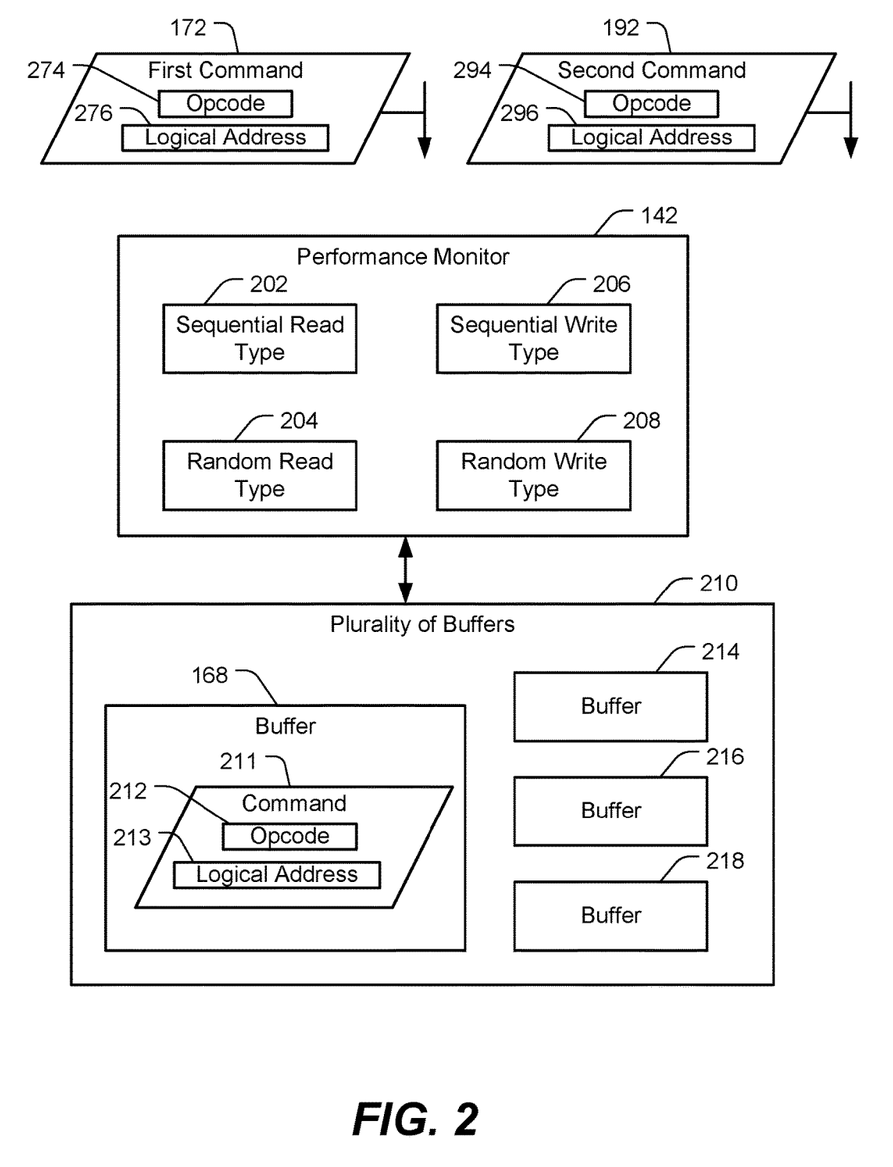
FIG. 2 is a block diagram depicting particular illustrative aspects of an example of the bridge device of FIGS. 1A and 1B.

FIG. 2 is a block diagram depicting particular illustrative aspects of an example of the bridge device 140 of FIGS. 1A and 1B. In FIG. 2, the performance monitor 142 is coupled to a plurality of buffers 210 of the bridge device 140.

The plurality of buffers 210 includes the buffer 168 and at least one other buffer, such as a buffer 214, a buffer 216, and a buffer 218. Although the particular example of FIG. 2 depicts that the plurality of buffers 210 includes four buffers, in other implementations, the plurality of buffers 210 may include another number of buffers.

One or more buffers of the plurality of buffers 210 may be associated with a particular operation type. In a particular example, the buffer 168 is associated with a first operation type, and at least one other buffer of the plurality of buffers 210 is associated with a second operation type that is different than the first operation type. As a non-limiting illustrative example, the first operation type may correspond to one of a sequential read type 202, a random read type 204, a sequential write type 206, and a random write type 208, and the second operation type may correspond to another of the sequential read type 202, the random read type 204, the sequential write type 206, and the random write type 208. In a particular example, each of the buffers 168, 214, 216, and 218 is associated with a respective operation type of the sequential read type 202, the random read type 204, the sequential write type 206, and the random write type 208.

In the example of FIG. 2, the performance monitor 142 is configured to assign commands to the plurality of buffers 210 based on operation types of the commands. For example, the performance monitor 142 may be configured to assign the first command 172 to the buffer 168 in response to determining that a first opcode 274 of the first command 172 indicates the first operation type (e.g., the sequential read type 202, the random read type 204, the sequential write type 206, or the random write type 208). As another example, the performance monitor 142 may be configured to assign the second command 192 to another buffer of the plurality of buffers 210 in response to determining that a second opcode 294 of the second command 192 indicates the second operation type (e.g., another of the sequential read type 202, the random read type 204, the sequential write type 206, and the random write type 208). The opcodes 274, 294 may each indicate a read opcode or a write opcode, as non-limiting illustrative examples.

Alternatively or in addition, the performance monitor 142 may be configured to assign commands to the plurality of buffers 210 based on logical addresses indicated by the commands, such as in response to determining based on the logical addresses whether the commands are sequential or random. For example, a first logical address 276 of the first command 172 may be sequential with respect to a logical address 213 of at least one other command 211 stored at the buffer 168. In this example, the performance monitor 142 may be configured to assign the first command 172 to the buffer 168 in response to determining, based on the first logical address 276 and the logical address 213, that the first command 172 is associated with a sequential type, such as the sequential read type 202 or the sequential write type 206. As another example, a second logical address 296 of the second command 192 may be sequential with respect to the logical address 213, and the performance monitor 142 may be configured to assign the second command 192 to the buffer 168 in response to determining, based on the second logical address 296 and the logical address 213, that the second command 192 is associated with a sequential type, such as the sequential read type 202 or the sequential write type 206.

Alternatively, in other examples, the performance monitor 142 may assign the first command 172 to another buffer of the plurality of buffers 210. For example, the performance monitor 142 may assign the first command 172 to another buffer of the plurality of buffers 210 in response to determining that the first opcode 274 is non-sequential with respect to the logical address 213. In this example, the performance monitor 142 may determine that the first command 172 is non-sequential (or "random") with respect to the command 211. As another example, the performance monitor 142 may assign the first command 172 to another buffer of the plurality of buffers 210 in response to determining that the first opcode 274 is different than an opcode 212 of the command 211.

In some implementations, one or more operations described with reference to FIGS. 1A and 1B may be performed on a "per-operation type" basis. For example, each buffer of the plurality of buffers 210 may be associated with a particular threshold 146. The performance monitor 142 may be configured to determine a performance metric 144 for each of the plurality of buffers 210 (based on commands associated with each of the buffers 210) and to compare each performance metric 144 to a corresponding threshold 146. Thus, the performance monitor 142 may perform throttling operations on a per-operation type basis (e.g., separately for each of the sequential read type 202, the random read type 204, the sequential write type 206, and the random write type 208).

By performing operations on a "per-operation type" basis, one or more aspects of FIG. 2 may enhance control of performance throttling in the system 100. For example, performance associated with execution of commands of a first operation type may be throttled independently of performance associated with execution of commands of one or more other operation types. As a result, performance associated with execution of one operation type may be throttled without affecting performance associated with execution of one or more other operation types.

Figure 3:
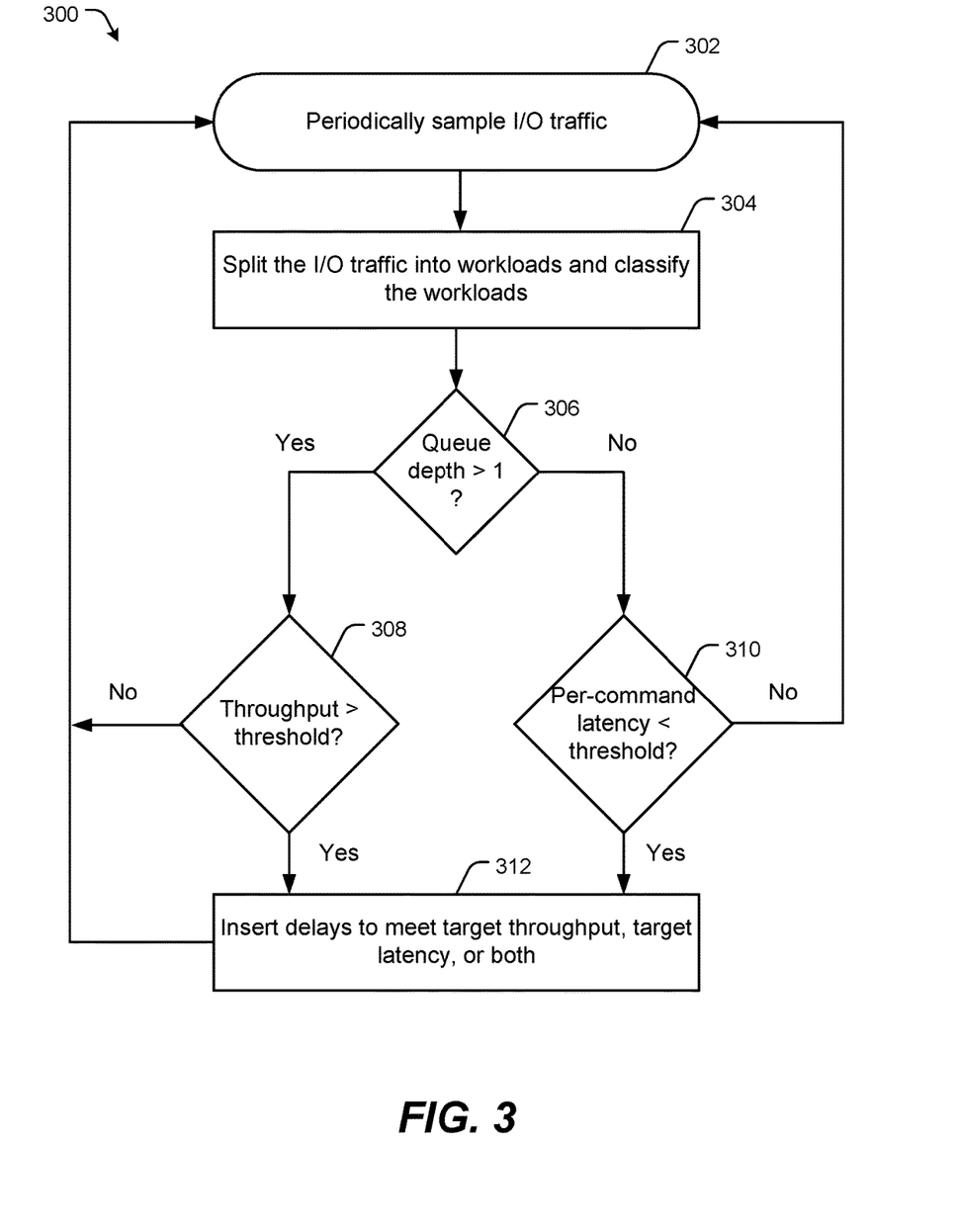
FIG. 3 is a flowchart of a particular illustrative example of a method of operation of the bridge device of FIGS. 1A and 1B

Referring to FIG. 3, an illustrative example of a method of operation of a bridge device is depicted and generally designated 300. In a particular example, the method 300 is performed by the bridge device 140.

The method 300 includes periodically sampling input/output (I/O) traffic, at 302. For example, the performance monitor 142 may periodically sample commands issued by the device 180 to the data storage device 102, such as any of the commands 172, 192, and 211. Depending on the particular implementation, the bridge device 140 may sample each command issued by the device 180 to the data storage device 102 or may sample fewer than all commands issued by the device 180 to the data storage device 102.

The method 300 further includes splitting the I/O traffic into workloads and classifying the workloads, at 304. For example, the performance monitor 142 may classify any of the commands 172, 192, and 211 by operation type, such as by identifying that the commands 172, 192, and 211 correspond to the sequential read type 202, the random read type 204, the sequential write type 206, or the random write type 208. The performance monitor 142 may assign the commands 172, 192, and 211 to the plurality of buffers 210 based on the corresponding operation types of the commands 172, 192, and 211.

The method 300 further includes determining whether a queue depth exceeds one, at 306. For example, the queue depth may correspond to the number of messages 166 of FIG. 1B.

If the queue depth exceeds one, the method 300 further includes determining whether throughput exceeds a threshold, at 308. For example, the throughput may correspond to the performance metric 144 (or another performance metric), and the threshold may correspond to the threshold 146 (or another threshold).

Alternatively, if the queue depth is less than or equal to one, the method 300 further includes determining whether per-command latency is less than a threshold, at 310. For example, the per-command latency may correspond to the performance metric 144 (or another performance metric), and the threshold may correspond to the threshold 146 (or another threshold).

In response to determining that throughput exceeds a threshold or that per-command latency is less than a threshold, the method 300 further includes inserting delays to meet a target throughput, a target latency, or both, at 312. For example, the performance monitor 142 may insert one or more NOOP commands 148 at the buffer 168 to reduce throughput to meet the target throughput, to reduce latency to meet the target latency, or both. Alternatively, if throughput is less than or equal to a threshold or if per-command latency is less than or equal to a threshold, the method 300 may continue, at 302.

By selectively throttling system performance using the method 300, performance differences associated with data storage devices may be reduced (e.g., "smoothed" or "equalized"). As a result, performance of the data storage devices may appear more "uniform" to end users.

Figure 4:
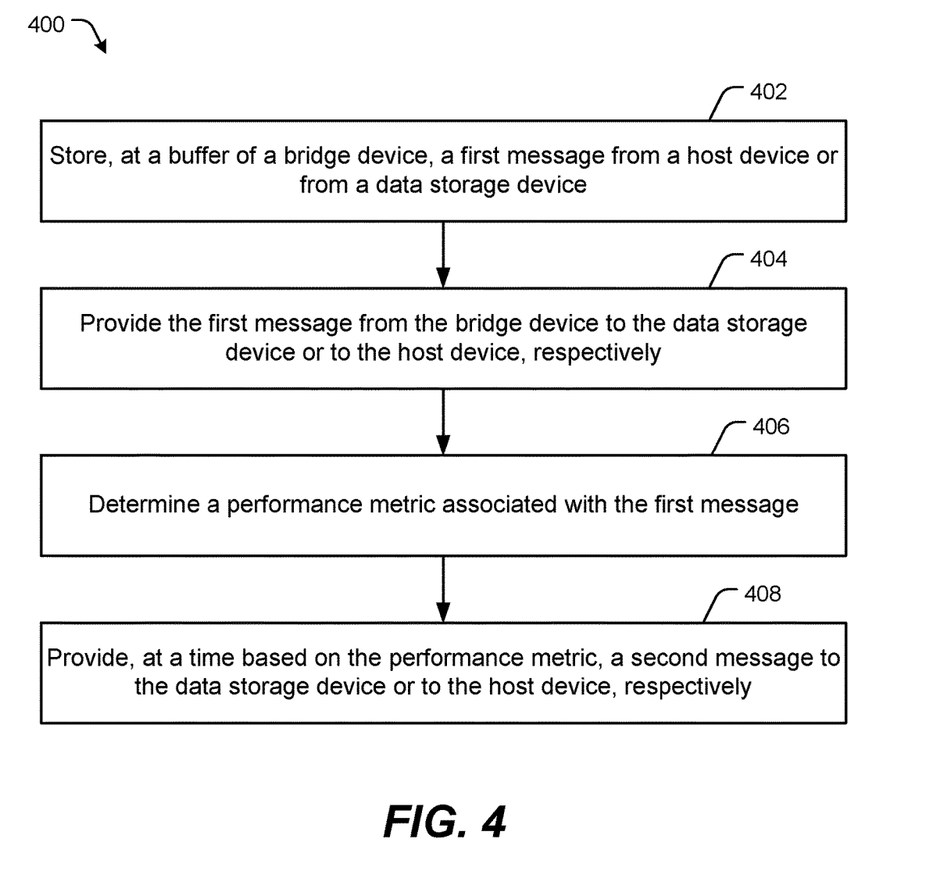
FIG. 4 is a flowchart of another particular illustrative example of a method of operation of the bridge device of FIGS. 1A and 1B.

Referring to FIG. 4, an illustrative example of a method of operation of a bridge device is depicted and generally designated 400. In a particular example, the method 400 is performed by the bridge device 140.

The method 400 includes storing, at a buffer of a bridge device, a first message from a host device or from a data storage device, at 402. For example, the bridge device 140 may receive the first command 172 from the device 180 via the host interface 162 and may store the first command 172 at the buffer 168. As another example, the bridge device 140 may receive the first status message 134 from the data storage device 102. Alternatively, the first message may correspond to another communication received from the device 180 or from the data storage device 102.

The method 400 further includes providing the first message from the bridge device to the data storage device or to the host device, respectively, at 404. For example, the bridge device 140 may provide the first command 172 to the data storage device 102 via the data storage device interface 154. As another example, the bridge device 140 may provide the first status message 134 to the device 180 via the host interface 162.

The method 400 further includes determining a performance metric associated with the first message, at 406. For example, the bridge device 140 may determine the performance metric 144 based on execution of the first command 172 by the data storage device 102. In an illustrative example, the performance metric 144 corresponds to (e.g., is equal to) or is based on the time interval 158. Alternatively or in addition, the performance metric 144 may correspond to or may be based on a throughput or a per-command latency (e.g., as described with reference to the method 300 of FIG. 3). In another example, the performance metric 144 is determined based on the first status message 134, such as based on a latency associated with providing the first status message 134 to the device 180.

The method 400 further includes providing, at a time based on the performance metric, a second message to the data storage device or to the host device, respectively, at 408. For example, the bridge device 140 may provide the second command 192 to the data storage device 102 based on the performance metric 144. As another example, the bridge device 140 may provide the second status message 135 to the device 180 based on the performance metric 144. In a particular example, the method 400 includes delaying providing the second message to the data storage device 102 or to the device 180, respectively, in response to determining that the performance metric 144 satisfies the threshold 146, such as by inserting at least one NOOP command 148 in the buffer 168.

In a particular example, the method 400 further includes one or more operations described with reference to the method 300 of FIG. 3. For example, the method 400 may include periodically sampling I/O traffic that includes the first command. For example, the performance monitor 142 may periodically sample commands issued by the device 180 to the data storage device 102, such as any of the commands 172, 192, and 211. The method 400 may further include splitting the I/O traffic into workloads and classifying the workloads. For example, the performance monitor 142 may classify any of the commands 172, 192, and 211 by operation type, such as by identifying that the commands 172, 192, and 211 correspond to the sequential read type 202, the random read type 204, the sequential write type 206, or the random write type 208. The performance monitor 142 may assign the commands 172, 192, and 211 to the plurality of buffers 210 based on the corresponding operation types of the commands 172, 192, and 211.

The method 400 may further include determining, in response to a queue depth of the buffer exceeding a particular value, whether a throughput satisfies a throughput threshold. For example, the queue depth may correspond to the number of messages 166 of FIG. 1B, the particular value may correspond to one, the throughput may correspond to the performance metric 144 (or another performance metric), and the threshold may correspond to the threshold 146 (or another threshold). In response to the queue depth failing to exceed the particular value, the method 400 may include determining whether a per-command latency satisfies a latency threshold. For example, the per-command latency may correspond to the performance metric 144 (or another performance metric), and the latency threshold may correspond to the threshold 146 (or another threshold). The second command may be delayed in response to the throughput satisfying the throughput threshold or the per-command latency satisfying the latency threshold.

By selectively throttling system performance using the method 400, performance differences associated with data storage devices may be reduced (e.g., "smoothed" or "equalized"). As a result, performance of the data storage devices may appear more "uniform" to end users.

In conjunction with the described embodiments, an apparatus includes means (e.g., the host interface 162 or the data storage device interface 154) for receiving, at a bridge device (e.g., the bridge device 140), a first message (e.g., the first command 172, the first status message 134, or another message) from a host device (e.g., the device 180) or from a data storage device (e.g., the data storage device 102). The apparatus further includes means (e.g., the buffer 168) for storing the first message at the bridge device and means (e.g., the performance monitor 142) for determining a performance metric (e.g., the performance metric 144) associated with the first message. The apparatus further includes means (e.g., the data storage device interface 154) for providing the first message from the bridge device to the data storage device or to the host device, respectively, and for providing, at a time based on the performance metric, a second message (e.g., the second command 192, the second status message 135, or another message) to the data storage device or to the host device, respectively. In a particular illustrative example, the apparatus further includes means (e.g., the timer 156) for determining a time interval (e.g., the time interval 158) associated with the first message. In this example, the performance metric may correspond to the time interval.

Although various components depicted herein are illustrated as block components and described in general terms, such components may include one or more microprocessors, state machines, or other circuits configured to enable such components to perform one or more operations described herein. For example, certain aspects of the performance monitor 142 may represent physical components, such as hardware controllers, state machines, logic circuits, or other structures, to enable performance throttling of the system 100. To further illustrate, in some implementations, the performance monitor 142 includes a comparator circuit configured to compare the performance metric 144 to the threshold 146 to determine whether performance throttling is to be initiated.

Alternatively or in addition, certain aspects described herein may be implemented using a microprocessor or microcontroller. In a particular embodiment, one or more aspects of the performance monitor 142 are implemented using a processor executing instructions (e.g., firmware). The instructions may be executable by the performance monitor 142 to compare the performance metric 144 to the threshold 146 to determine whether performance throttling is to be initiated. The processor may retrieve the instructions from the non-volatile memory 104. Alternatively or in addition, executable instructions that are executed by the processor may be stored at a separate memory location that is not part of the non-volatile memory 104, such as at a read-only memory (ROM) that may be included in the bridge device 140.

The data storage device 102 and the bridge device 140 may be coupled to, attached to, or embedded within one or more accessing devices, such as within a housing of the device 180. For example, the data storage device 102 and the bridge device 140 may be embedded within the device 180 in accordance with a Joint Electron Devices Engineering Council (JEDEC) Solid State Technology Association Universal Flash Storage (UFS) configuration. To further illustrate, the data storage device 102 and the bridge device 140 may be integrated within an electronic device (e.g., the device 180), such as a mobile telephone, a computer (e.g., a laptop, a tablet, or a notebook computer), a music player, a video player, a gaming device or console, an electronic book reader, a personal digital assistant (PDA), a portable navigation device, or other device that uses internal non-volatile memory.

In one or more other implementations, the data storage device 102 is implemented in a portable device configured to be selectively coupled to one or more external devices, such as a host device. For example, the data storage device 102 may be removable from the device 180 (i.e., "removably" coupled to the device 180). As an example, the data storage device 102 may be removably coupled to the device 180 in accordance with a removable universal serial bus (USB) configuration. Depending on the particular implementation, the bridge device 140 may correspond to a socket of the device 180 into which the portable device is received, or the bridge device 140 may be attached to the data storage device 102 (and removable from the device 180).

The device 180 may correspond to a mobile telephone, a computer (e.g., a laptop, a tablet, or a notebook computer), a music player, a video player, a gaming device or console, an electronic book reader, a personal digital assistant (PDA), a portable navigation device, another electronic device, or a combination thereof. The device 180 may communicate via a controller, which may enable the device 180 to communicate with the data storage device 102. The device 180 may operate in compliance with a JEDEC Solid State Technology Association industry specification, such as an embedded MultiMedia Card (eMMC) specification or a Universal Flash Storage (UFS) Host Controller Interface specification. The device 180 may operate in compliance with one or more other specifications, such as a Secure Digital (SD) Host Controller specification as an illustrative example. Alternatively, the device 180 may communicate with the data storage device 102 in accordance with another communication protocol. In some implementations, the data storage device 102 and the bridge device 140 may be integrated within a network-accessible data storage system, such as an enterprise data system, an NAS system, or a cloud data storage system, as illustrative examples.

In some implementations, the data storage device 102 includes a solid state drive (SSD). The data storage device 102 may function as an embedded storage drive (e.g., an embedded SSD drive of a mobile device), an enterprise storage drive (ESD), a cloud storage device, a network-attached storage (NAS) device, or a client storage device, as illustrative, non-limiting examples. In some implementations, the data storage device 102 may be coupled to the device 180 via a network. For example, the network may include a data center storage system network, an enterprise storage system network, a storage area network, a cloud storage network, a local area network (LAN), a wide area network (WAN), the Internet, and/or another network. Depending on the particular implementation, the bridge device 140 may be implemented on any "side" of the network (e.g., at a data storage device side or at an access device side).

To further illustrate, the data storage device 102 may be configured to be coupled to the device 180 as embedded memory, such as in connection with an embedded Multi-Media Card (eMMC®) (trademark of JEDEC Solid State Technology Association, Arlington, Va.) configuration, as an illustrative example. The data storage device 102 may correspond to an eMMC device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

The non-volatile memory 104 may include a resistive random access memory (ReRAM), a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), another type of memory, or a combination thereof. The non-volatile memory 104 may include a semiconductor memory device.

Semiconductor memory devices include volatile memory devices, such as dynamic random access memory ("DRAM") or static random access memory ("SRAM") devices, non-volatile memory devices, such as resistive random access memory ("ReRAM"), magnetoresistive random access memory ("MRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where they direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in they direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional exemplary structures described but cover all relevant memory structures within the spirit and scope of the disclosure as described herein and as understood by one of skill in the art. The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus comprising:
   a first interface configured to receive a first message from a host device or from a data storage device;
   a buffer coupled to the first interface and configured to store the first message;
   a second interface coupled to the buffer and configured to:
      provide the first message to the data storage device or to the host device, respectively; and
      provide, at a delayed time based on a performance metric associated with the first message, a second message to the data storage device or to the host device, respectively, wherein the performance metric is a per-command latency of the data storage device; and
   a circuit configured to:
      determine the performance metric; and
      determine the delayed time of the second message to the data storage device or to the host device, respectively, by the second interface in response to determining that the per-command latency of the first message is less than a threshold, thereby increasing per-command latency of the data storage device to a target latency.

2. The apparatus of claim 1, wherein the threshold is stored in a configuration register that is pre-set at a factory.

3. The apparatus of claim 2, wherein the circuit is further configured to insert at least one no-operation (NOOP) command at the buffer to delay providing the second message to the data storage device or to the host device, respectively.

4. The apparatus of claim 1, further comprising a timer configured to determine a time interval associated with the first message.

5. The apparatus of claim 4, wherein the per-command latency of the first message is obtained from the time interval.

6. The apparatus of claim 1, wherein the circuit is further configured to delay providing of the second message to the data storage device or to the host device, respectively, to thereby reduce per-command latency differences between the data storage device and one or more additional data storage devices.

7. The apparatus of claim 1, wherein the circuit is configured to determine an additional performance metric that is equal to a throughput associated with the first message.

8. The apparatus of claim 1, wherein the circuit comprises a counter circuit configured to determine a number of messages stored at the buffer.

9. The apparatus of claim 8, wherein the circuit is further configured to determine the performance metric in response to determining that the number exceeds one.

10. The apparatus of claim 1, further comprising a plurality of buffers that includes the buffer and at least one other buffer, wherein:
    the buffer is associated with a first operation type; and
    the at least one other buffer is associated with a second operation type that is different than the first operation type.

11. The apparatus of claim 10, wherein the circuit is further configured to assign the first message to the buffer in response to determining that an opcode of the first message indicates the first operation type.

12. The apparatus of claim 10, wherein the circuit is further configured to assign the first message to the buffer in response to determining, based on a first logical address of the first message and at least one other logical address of at least one other message, that the first message is associated with the first operation type.

13. The apparatus of claim 10, wherein:
the first operation type corresponds to one of a sequential read type, a random read type, a sequential write type, or a random write type; and
the second operation type corresponds to another of the sequential read type, the random read type, the sequential write type, or the random write type.

14. The apparatus of claim 1, wherein the first interface is further configured to receive the first message from the host device.

15. The apparatus of claim 1, wherein the first interface is further configured to receive the first message from the data storage device.

16. A method comprising:
storing, at a buffer of a bridge device connected to a first data storage device, a first message from a host device or from the first data storage device;
providing the first message from the bridge device to the first data storage device or to the host device, respectively;
determining a performance metric associated with the first message, wherein the performance metric is a per-command latency of the first data storage device; and
providing, at a delayed time based on the per-command latency being less than a threshold, a second message to the first data storage device or to the host device, respectively, to thereby increase per-command latency of the first data storage device to a target latency and reduce differences between the first data storage device and at least a second data storage device of a group of storage devices that are in communication with the host device.

17. The method of claim 16, further comprising delaying providing the second message to the first data storage device or to the host device, respectively, in response to determining that the performance metric satisfies a threshold, wherein delaying providing the second message to the first data storage device comprises inserting at least one no-operation (NOOP) command in the buffer.

18. The method of claim 17, further comprising:
periodically sampling input/output (I/O) traffic, the I/O traffic including the first message;
splitting the I/O traffic into workloads;
classifying the workloads;
in response to a queue depth of the buffer exceeding a particular value, determining whether a throughput satisfies a throughput threshold; and
in response to the queue depth failing to exceed the particular value, determining whether a per-command latency is less than a latency threshold,
wherein the second message is delayed in response to the per-command latency being less than the latency threshold.

19. A bridge device comprising:
means for receiving, at the bridge device configured to connect to a first data storage device, a first message from a host device or from the first data storage device;
means for storing the first message at the bridge device;
means for determining a per-command latency associated with the first message;
means for providing the first message from the bridge device to the first data storage device or to the host device, respectively; and
means for providing, at a delayed time based on the per-command latency being less than a threshold, a second message to the first data storage device or to the host device, respectively, to thereby increase per-command latency of the first data storage device to a target latency and reduce differences, including per-command latency differences, between the first data storage device and at least a second data storage device of a group of storage devices that are in communication with the host device.

20. The bridge device of claim 19, further comprising means for determining a time interval associated with the first message.

* * * * *